(12) United States Patent
Ratcliffe et al.

(10) Patent No.: US 8,939,039 B2
(45) Date of Patent: Jan. 27, 2015

(54) LOAD CELL FOR A DOWNHOLE LOAD MEASURING TOOL

(75) Inventors: James David Ratcliffe, Hook (GB);
Timothy Gill, Hook (GB)

(73) Assignee: Sondex Wireline Limited, Yately (GB)

( * ) Notice: Subject to any disclaimer, the term of this patent is extended or adjusted under 35 U.S.C. 154(b) by 417 days.

(21) Appl. No.: 13/099,422

(22) Filed: May 3, 2011

(65) Prior Publication Data

US 2012/0279322 A1   Nov. 8, 2012

(30) Foreign Application Priority Data

May 11, 2010   (GB) .................................. 1007813.7

(51) Int. Cl.
*G01L 1/22*       (2006.01)
*E21B 17/02*      (2006.01)
*E21B 47/00*      (2012.01)

(52) U.S. Cl.
CPC ........... *E21B 47/0006* (2013.01); *E21B 17/023* (2013.01); *G01L 1/2243* (2013.01)
USPC .................................................. 73/862.627

(58) Field of Classification Search
CPC .. G01L 1/2243; E21B 47/0006; E21B 17/023
USPC ........................................ 73/708, 720, 726
See application file for complete search history.

(56) References Cited

U.S. PATENT DOCUMENTS

| 4,265,110 A | 5/1981 | Moulin |
| 4,269,063 A | 5/1981 | Escaron et al. |
| 4,275,599 A | 6/1981 | Kohlenberger et al. |
| 5,358,059 A * | 10/1994 | Ho ................................. 175/45 |
| 6,662,645 B2 * | 12/2003 | Brewer ....................... 73/152.48 |
| 2002/0000338 A1 * | 1/2002 | Gross et al. .................... 177/211 |
| 2008/0216554 A1 * | 9/2008 | McKee .......................... 73/1.15 |
| 2009/0194332 A1 * | 8/2009 | Pastusek et al. ................ 175/40 |

FOREIGN PATENT DOCUMENTS

| CN | 1076779 A | 9/1993 |
| CN | 2154478 Y | 1/1994 |
| CN | 1718998 A | 1/2006 |

OTHER PUBLICATIONS

Unofficial English translation of CN Office Action issued Apr. 1, 2014 in connection with corresponding CN Patent Application No. 201110134056.2.
Chinese Office Action issued in connection with corresponding CN Application No. 201110134056.2 on Oct. 20, 2014.

* cited by examiner

*Primary Examiner* — Lisa Caputo
*Assistant Examiner* — Brandi N Hopkins
(74) *Attorney, Agent, or Firm* — GE Global Patent Operation

(57) ABSTRACT

A load cell for a downhole load measuring tool is provided. The load cell comprises a plurality of strain gauges arranged in a balanced array, wherein the array of strain gauges is provided in fluid which, in use, is at substantially the same pressure as the surrounding downhole fluid.

18 Claims, 3 Drawing Sheets

LOAD CELL FOR A DOWNHOLE LOAD MEASURING TOOL

BACKGROUND OF THE INVENTION

1. Field of the Invention

Embodiments of the present invention relate to a load cell for a downhole load measuring tool, for example to measure the tension or compression applied to an oil well logging string by a wireline or tractor tool.

2. Description of the Prior Art

Well logging engineers often require a load measuring sensor to be fitted between the top of a logging toolstring and the bottom of a wireline cable, for example on the cable head. This monitors the axial load, which is being applied directly to the toolstring. This is an important measurement to determine whether the toolstring has become stuck down the well and/or if the tension in the wireline is approaching the breaking point of the cable head. The cable head load sensor also helps the logging engineer to determine the forces being exerted on the toolstring by the wireline and the tractor during operations in highly deviated wells.

A challenge faced when designing a cable head load unit is to decouple the axial load created by downhole hydrostatic pressure alone, from the load applied by the wireline or tractor. In a deep well the hydrostatic pressure will result in tens of thousands of pounds of axial compressive force to be applied to the toolstring and this is an order of magnitude greater than the maximum potential wireline force.

US 2008/0216554 discloses a downhole load cell which acquires downhole pressure and temperature information. This downhole pressure and temperature information is used to calibrate the downhole load cell readings. However, it would be desirable not to have to take temperature and pressure measurements and then have to temperature and pressure calibrate the load cell as this increases manufacturing time and requires the load cell to have compensation files which need to be prepared and used when measurements are made.

SUMMARY OF THE INVENTION

According to an embodiment of the present invention there is provided a load cell for a downhole load measuring tool. The load cell comprises a plurality of strain gauges arranged in a balanced array, wherein the array of strain gauges is provided in fluid which, in use, is at substantially the same pressure as the surrounding downhole fluid.

A downhole load measuring tool including a load cell, the load cell comprising: a plurality of strain gauges arranged in a balanced array, wherein the array of strain gauges is provided in fluid which, in use, is at substantially the same pressure as the surrounding downhole fluid.

BRIEF DESCRIPTION OF THE DRAWINGS

Embodiments of the present invention will now be described, by way of example only, with reference to the accompanying drawings, in which.

DETAILED DESCRIPTION OF THE INVENTION

Figure 1:
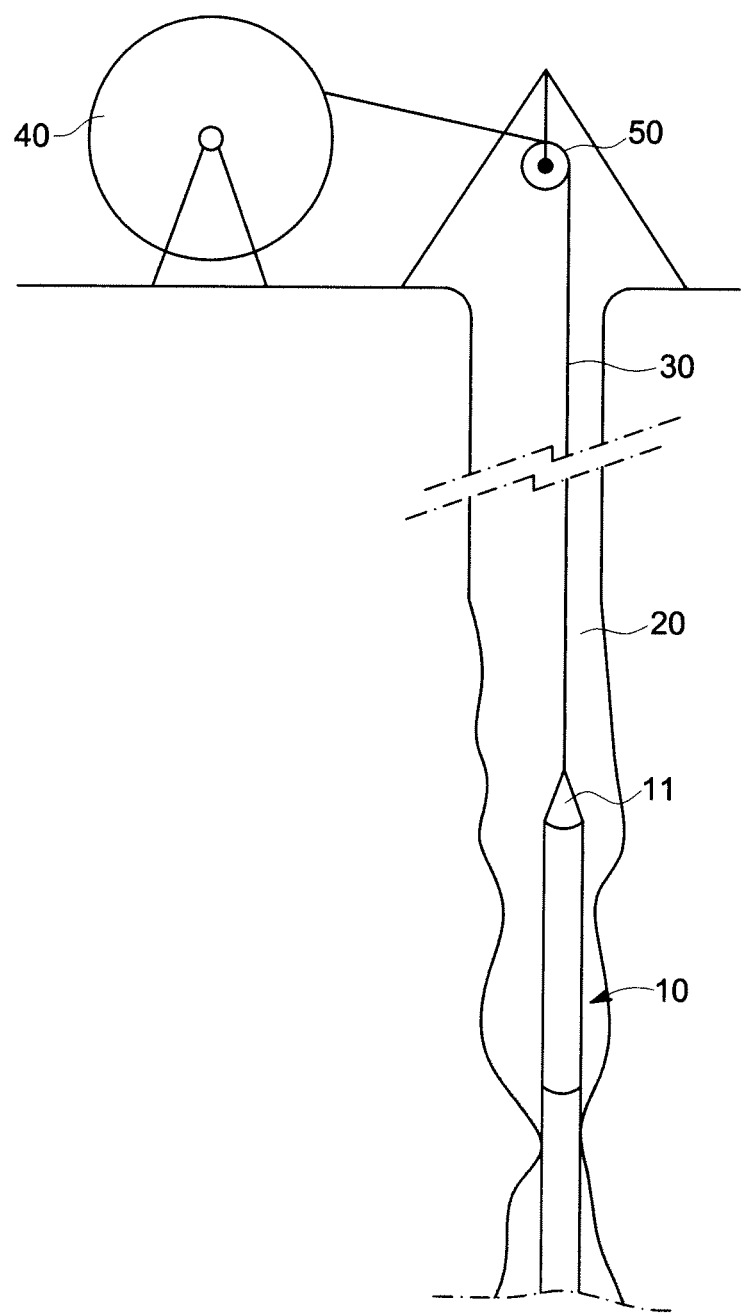
FIG. 1 shows a downhole unit located in the borehole of a well.

FIG. 1 illustrates a downhole unit 10 located in the borehole 20 of a well.

The downhole unit 10 is suspended from a wireline 30 fed from a drum 40 via a pulley 50 provided at the surface. A load cell may be provided at any appropriate point such as in the cable head 11. As schematically illustrated in FIG. 1, the downhole unit 10 may become stuck in the borehole.

Figure 2:
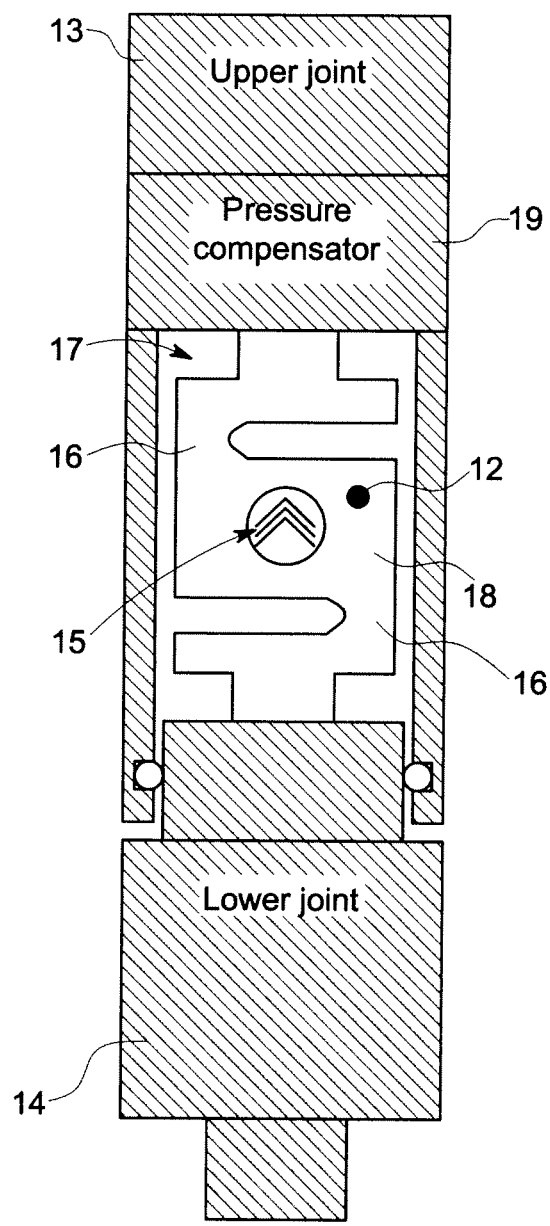
FIG. 2 shows a load cell of an exemplary embodiment of the present invention.

FIG. 2 shows a load cell 12 which may be used with the downhole unit 10 shown in FIG. 1. The load cell 12 in this example is provided between upper and lower joints 13, 14. Strain gauges 15 are attached to flexures 16 and the entire load cell is immersed in fluid 17 that is at the same hydrostatic pressure as the surrounding well fluid. The strain gauges 15 are designed specifically to measure shear strain in the flexures 16 and the flexures are arranged to bend as axial load is applied to the load cell 12. The load cell 12 comprises a number of groups of four strain gauges. Each group is arranged to measure shear strain in a beam 18, and the total number of strain gauges are arranged in a balanced array such as a Wheatstone bridge. Not all of the strain gauges 15 making up the Wheatstone Bridge are shown in FIG. 2 as some will be on other sides of the beam 18. As external downhole hydrostatic pressure is applied via the pressure compensator 19 which may, for example, be a piston, diaphragm etc and the material of the flexures 16 experience the resulting hydrostatic strain, the four gauges in each group of the balanced array strain by an equal amount and the balance is unaffected. Similarly, downhole temperature variations also affect all strain gauges in the balanced array by an equal amount not affecting the balancing of the array. However, as axial load is applied to the cell, the flexures 16 experience shear strain and the bridge balance is changed accordingly. This is sensed by electronics (not shown) built into the unit.

Figure 3:
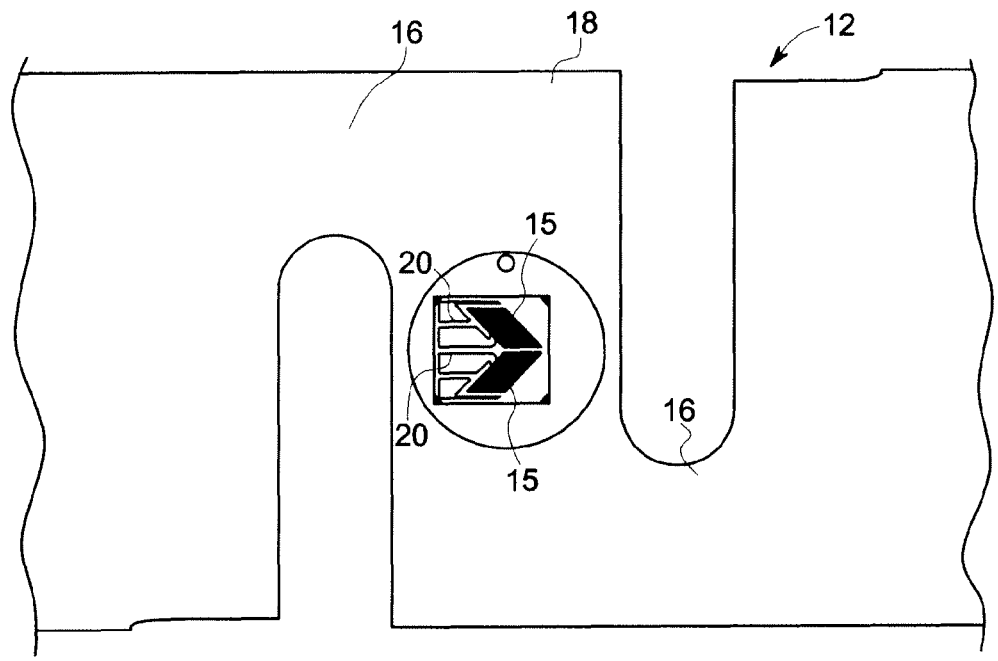
FIG. 3 is a more detailed perspective view of the load cell shown in FIG. 2.

FIG. 3 shows a more detailed perspective view of the load cell 12. Two strain gauges 15 can be seen orientated perpendicular to each other. Two other strain gauges (not shown) are arranged similarly on the reverse side of the beam 18 also in a perpendicular arrangement to each other. In this example each strain gauge 15 is a resistance element with the four individual resistance elements arranged in a Wheatstone Bridge using appropriate electrical connections 20.

The beam 18 may be made from any suitable material. In this example the beam 18 is made from stainless steel. The beam material is preferably selected to have a Modulus of Elasticity which is substantially matched to that of the material from which the strain gauges 15 are made. In this example the beam 18 is made from stainless steel 17-4 PH. The stainless steel may have been heat reated to provide sufficient strength to withstand the downhole conditions.

Figure 4:
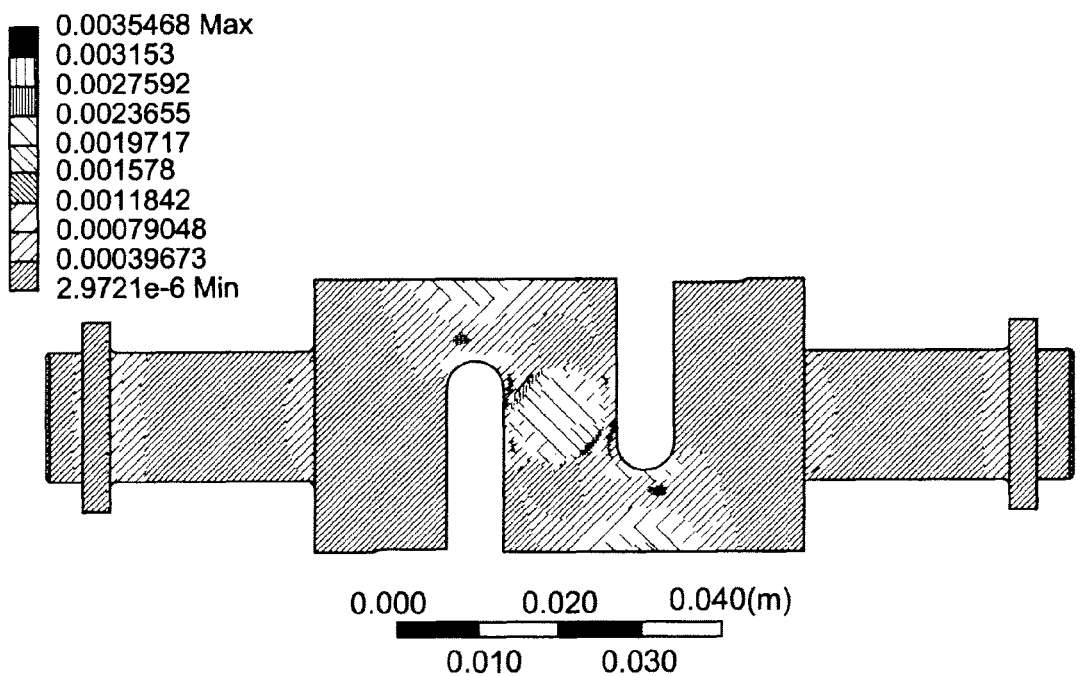
FIG. 4 schematically illustrates the elastic strain experienced by the load cell under a load.

FIG. 4 schematically illustrates the elastic strain experienced by the beam 18 when the load cell 12 experiences a load of 12000 N. As can be seen from FIG. 4, different levels of strain are experienced across the cell, in particular greatest strain is experienced around the flexures 16. During use these different strains experienced in different parts of the beam 18 are detected by the plurality of strain gauges 15. The resulting electrical output, in this example with the strain gauges 15 arranged in a Wheatstone Bridge, is detected by an appropriate controller, such as a microprocessor or electrical circuit (not shown) to provide an indication of the load to which the load cell 12 and thus the downhole unit 10 is subjected.

As explained above, as the strain gauges 15 are arranged in a balanced array and subjected to the downhole pressure via the pressure compensator 19, this results in the load cell 12 straining uniformly in all directions as a result of the downhole pressure such that the overall strain measured by the balanced array of strain gauges due to the downhole pressure will effectively be zero.

Pressure tests were performed on the load cell illustrated in FIG. 2 using an oil containment flask filled with Capella oil into which the load cell was immersed. The Wheatstone Bridge was energized to +/−5 volts using a laboratory power supply with the balance voltage amplified 100× with an op-amplifier circuit before being read using a digital volt meter. With this configuration and with a full load of 12000 N, the sensitivity of the load cell 12 was found to be 11.7 N/mV. Experimental results found that varying the ambient pressure from 0 to 20000 psi ($1.38 \times 10^5$ kN/m$^2$) led to a maximum variation in balance voltage of the Wheatstone Bridge of a few milli volts representing an error of less than half a percent of the measured load, more typically of 0.2% or less, such that compensation for the downhole pressure variation is not necessary, providing a simpler, more reliable and less expensive control arrangement.

Experiments were also performed to determine whether there would be any affect on the sensitivity of the balanced array of strain gauges due to variations in temperature caused by the downhole fluids in which the load cell would be used.

The load cell illustrated in FIG. 2 was baked in an oven with the temperature cycled from room temperature up to 177° C. while attached to a data logger recording the load cell balance voltage and load cell temperature simultaneously. It was found that errors of less than 0.5%, more typically of 0.2% or less are experienced by this ambient temperature variation. This deviation is sufficiently small that it does not need to be compensated for in the sensor electronics providing a simpler, more reliable and less expensive control arrangement.

Use of the load cell described above in downhole pressure and temperature environments results in the strain gauges 15 all getting slightly shorter under increased hydrostatic pressure and getting slightly longer due to elevated temperatures. However, despite the elevated pressures and temperatures to which the load cell 12 is subjected, the balance of the array of strain gauges 15 is maintained. However, as illustrated in our FIG. 4, when the load cell 12 is subjected to a load (in the example of FIG. 4 a load of 12000 N is used) there is a difference in strain across the cell 12. This difference results in one of the principle vectors pointing inwards whilst the other points outwards resulting in two of the strain gauges 15 getting longer whilst the other two get shorter changing the balance of the Wheatstone Bridge. This change in the balance results in an output voltage which is indicative of the load to which the load cell is subjected.

The load cell 12 is calibrated such that an associated controller provides an indication of the load to which the load cell 12 is subjected, for example by using a look-up table or appropriate algorithm for example mapping output voltages of the balanced array to corresponding loads. The indication of the load to which the load cell 12 and thus the tool string is subjected may be displayed to appropriate operators at the surface or stored for later analysis or both.

An advantageous element of embodiments of the invention is using shear strain gauges in a pressure balanced environment, where the gauges experience full hydrostatic pressure from all directions.

Another advantage with using this configuration, is that under the effects of both temperature and hydrostatic pressure, the strain elements are all deformed by the same amount, theoretically producing no overall change in the balance of the array such as the Wheatstone Bridge. Change in balance is only created when non pressure or temperature related loading generates shear strain in the load cell. In practice, due to imperfections in the gauges 15, there will be some error deviation. However, this has been found to be sufficiently small as to be considered negligible.

Using a load cell of an embodiment of the present invention produces a significant improvement in measurement resolution, as well as a much simplified calibration process. The output of the load cell is essentially linear, therefore calibration can be performed with three measurement points. There is also no requirement to temperature or pressure calibrate the tool as this is all compensated for by the balanced array, such as a Wheatstone bridge arrangement of the strain gauges. This significantly reduces the manufacturing time, and removes the need for compensation files to be supplied to the client with the tool.

Many variations may be made to the examples described above whilst still falling within the scope of the embodiments of the present invention. For example, although two flexures are illustrated, one or three or more flexures could be used. Furthermore, any suitable pressure compensator 19 may be used to apply the external downhole hydrostatic pressure, when in use, to the fluid within the load cell in which the balanced array of strain gauges is provided, such as a piston, diaphragm, bellows etc.

What is claimed is:

1. A load cell for a downhole load measuring tool, the load cell comprising:
   a plurality of shear strain gauges arranged in a balanced array, wherein the balanced array of shear strain gauges is provided in fluid which, in use, is at substantially the same pressure as the surrounding downhole fluid; and
   a pressure compensator configured to apply hydrostatic strain to the balanced array, and when subjected to such strain, the balanced array is configured such that each shear strain gauge of the balanced array is uniformly strained.

2. The load cell according to claim 1, wherein the load cell is arranged to measure shear strain across the load cell.

3. The load cell according to claim 1, wherein the load cell has a beam upon which the balanced array of strain gauges is provided and wherein the beam includes at least one flexure arranged to flex as axial load is applied to the load cell.

4. The load cell according to claim 3, wherein the beam has two strain gauges arranged on the beam.

5. The load cell according to claim 3, wherein the Modulus of Elasticity of the beam is substantially matched to that of the strain gauges.

6. The load cell according to claim 1, wherein the balanced array is a Wheatstone Bridge.

7. The load cell according to claim 1, wherein the array of strain gauges is provided in fluid which, in use, is also at substantially the same temperature as the surrounding downhole fluid.

8. A downhole load measuring tool comprising:
   a load cell, the load cell comprising:
      a plurality of shear strain gauges arranged in a balanced array, wherein the array of shear strain gauges is provided in fluid which, in use, is at substantially the same pressure as the surrounding downhole fluid; and
      a pressure compensator configured to apply hydrostatic strain to the balanced array, and when subjected to such strain, the balanced array is configured such that each shear strain gauge of the balanced array is uniformly strained.

9. The downhole load measuring tool according to claim 8, comprising a cable head in which the load cell is provided.

10. The load cell according to claim 6, wherein an axial load applied to the downhole tool causes the Wheatstone bridge to become electrically unbalanced resulting in an output voltage proportional to the axial load applied to the downhole tool.

11. The load cell according to claim 4, wherein the plurality of sheer strain gauges are attached to the beam, and wherein the plurality of sheer strain gauges comprises first and second pairs of sheer strain gauges arranged on opposite sides of the beam.

12. The downhole load measuring tool according to claim 8, wherein the load cell is arranged to measure shear strain across the load cell.

13. The downhole load measuring tool according to claim 8, wherein the load cell has a beam upon which the balanced array of strain gauges is provided and wherein the beam includes at least one flexure arranged to flex as axial load is applied to the load cell.

14. The downhole load measuring tool according to claim 13, wherein the beam has two strain gauges arranged on the beam.

15. The downhole load measuring tool according to claim 8, wherein the Modulus of Elasticity of the beam is substantially matched to that of the strain gauges.

16. The downhole load measuring tool according to claim 8, wherein the balanced array is a Wheatstone Bridge.

17. The downhole load measuring tool according to claim 16, wherein an axial load applied to the downhole tool causes the Wheaststone bridge to become electrically unbalanced resulting in an output voltage proportional to the axial load applied to the downhole tool.

18. The downhole load measuring tool according to claim 14, wherein the plurality of sheer strain gauges are attached to the beam, and wherein the plurality of sheer strain gauges comprises first and second pairs of sheer strain gauges arranged on opposite sides of the beam.

* * * * *